United States Patent
Zeng et al.

(10) Patent No.: US 8,010,137 B2
(45) Date of Patent: *Aug. 30, 2011

(54) METHOD AND SYSTEM FOR ADAPTIVE MULTI RATE (AMR) AND MEASUREMENTS DOWNLINK ADAPTATION

(75) Inventors: Huaiyu Zeng, Red Bank, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/555,795

(22) Filed: Sep. 8, 2009

(65) Prior Publication Data

US 2010/0003974 A1  Jan. 7, 2010

Related U.S. Application Data

(63) Continuation of application No. 11/326,066, filed on Jan. 5, 2006, now Pat. No. 7,587,211.

(51) Int. Cl.
*H04B 15/00* (2006.01)

(52) U.S. Cl. .......... 455/501; 455/63.1; 455/67.13; 455/114.2; 375/340; 370/394

(58) Field of Classification Search .......... 455/501, 455/63.1, 67.13, 114.2, 222, 226.1, 278.1, 455/296; 375/340, 341; 370/394
See application file for complete search history.

(56) References Cited

U.S. PATENT DOCUMENTS

| | | | | |
|---|---|---|---|---|
| 5,257,397 A * | 10/1993 | Barzegar et al. | ......... | 455/553.1 |
| 5,995,499 A * | 11/1999 | Hottinen et al. | ......... | 370/337 |
| 6,009,122 A * | 12/1999 | Chow | ......... | 375/260 |
| 6,658,046 B1 * | 12/2003 | Miura | ......... | 375/148 |
| 6,957,175 B2 * | 10/2005 | Shin et al. | ......... | 702/191 |
| 7,069,190 B2 * | 6/2006 | Shin et al. | ......... | 702/189 |
| 7,218,641 B2 * | 5/2007 | Kuffner et al. | ......... | 370/445 |
| 7,227,908 B2 * | 6/2007 | Suzuki et al. | ......... | 375/296 |
| 7,254,496 B2 * | 8/2007 | Shin et al. | ......... | 702/60 |
| 7,301,902 B2 * | 11/2007 | Rambo et al. | ......... | 370/230 |
| 7,352,720 B2 * | 4/2008 | Chang et al. | ......... | 370/333 |
| 7,487,356 B2 * | 2/2009 | Kunisa | ......... | 713/176 |
| 7,796,711 B2 * | 9/2010 | Heiman et al. | ......... | 375/341 |
| 2002/0039398 A1 * | 4/2002 | Klinski | ......... | 375/377 |
| 2004/0093178 A1 * | 5/2004 | Shin et al. | ......... | 702/69 |
| 2004/0174899 A1 * | 9/2004 | Rambo et al. | ......... | 370/465 |
| 2005/0187728 A1 * | 8/2005 | Shin et al. | ......... | 702/66 |

(Continued)

OTHER PUBLICATIONS

Mark Austin, Ph.D., Cingular Wireless, SAIC and Synchronized Networks for Increased GSM Capacity, 3G Americas' SAIC Working Group, Sep. 2003, pp. 1-26.

(Continued)

*Primary Examiner* — Minh D Dao
(74) *Attorney, Agent, or Firm* — McAndrews, Held & Malloy, Ltd.

(57) ABSTRACT

Various aspects of a method and system for adaptive multi rate and measurements adaptation may include a processor that enables computation of at least one signal level measurement for at least one received signal. The processor may enable cancelling of interfering signals received in addition to the received signal based on processing of a received bit sequence using a first burst process operation (BP) in a first decoding algorithm that utilizes SAIC operations. The processor may also enable cancelling of noise signals received in addition to the received signal based on processing the received bit sequence using a second BP operation that utilizes redundancy and imposes a physical constraint during decoding. The processor may also enable adjustment of the computed at least one signal level measurement.

24 Claims, 9 Drawing Sheets

U.S. PATENT DOCUMENTS

| | | | |
|---|---|---|---|
| 2006/0039510 A1* | 2/2006 | Heiman et al. | 375/341 |
| 2006/0050813 A1* | 3/2006 | Heiman et al. | 375/341 |
| 2006/0115079 A1* | 6/2006 | Heiman et al. | 380/28 |
| 2006/0251192 A1* | 11/2006 | Heiman et al. | 375/341 |
| 2006/0259297 A1* | 11/2006 | Heiman et al. | 704/229 |
| 2006/0274866 A1* | 12/2006 | Chang | 375/346 |
| 2007/0153942 A1* | 7/2007 | Zeng et al. | 375/340 |
| 2007/0156402 A1* | 7/2007 | Heiman | 704/242 |
| 2007/0165757 A1* | 7/2007 | Heiman et al. | 375/347 |
| 2008/0052604 A1* | 2/2008 | Karaoguz et al. | 714/776 |
| 2008/0080363 A1* | 4/2008 | Black et al. | 370/209 |
| 2008/0097765 A1* | 4/2008 | Rambo et al. | 704/500 |
| 2008/0219381 A1* | 9/2008 | Karaoguz et al. | 375/316 |
| 2008/0225163 A1* | 9/2008 | Heiman et al. | 348/461 |

OTHER PUBLICATIONS

3rd Generation Partnership Project; Technical Specification Group GSM/EDGE Radio Access Network; Link Adaptation (Release 6), Technical Specification 45.009, V6 2.0 (Jun. 2005).

* cited by examiner

METHOD AND SYSTEM FOR ADAPTIVE MULTI RATE (AMR) AND MEASUREMENTS DOWNLINK ADAPTATION

CROSS-REFERENCE TO RELATED APPLICATIONS/INCORPORATION BY REFERENCE

This application is a continuation of U.S. application Ser. No. 11/326,066 filed Jan. 5, 2006, which claims priority to, and claims the benefit of U.S. Provisional Application Ser. No. 60/752,704 filed on Dec. 21, 2005.

This application makes reference to:
U.S. patent application Ser. No. 11/325,721, filed on even data herewith;
U.S. patent application Ser. No. 11/325,720, filed on even data herewith;
U.S. patent application Ser. No. 11/325,751, filed on even data herewith;
U.S. patent application Ser. No. 11/325,808, filed on even data herewith;
U.S. patent application Ser. No. 11/325,759, filed on even data herewith;
U.S. application Ser. No. 11/150,926 filed on Jun. 13, 2005;
U.S. application Ser. No. 11/271,692 filed on Nov. 10, 2005;
U.S. application Ser. No. 11/150,931 filed on Jun. 13, 2005;
U.S. application Ser. No. 11/150,957 filed on Jun. 13, 2005;
U.S. application Ser. No. 11/151,030 filed on Jun. 13, 2005.
U.S. application Ser. No. 11/151,029 filed on Jun. 13, 2005;
U.S. application Ser. No. 11/189,509 filed on Jul. 26, 2005; and
U.S. application Ser. No. 11/189,634 filed on Jul. 26, 2005.

Each of the above stated applications is hereby incorporated herein by reference in its entirety.

FIELD OF THE INVENTION

Certain embodiments of the invention relate to cellular communication systems. More specifically, certain embodiments of the invention relate to a method and system for adaptive multi rate (AMR) and measurements downlink adaptation.

BACKGROUND OF THE INVENTION

Cellular communication systems provide wireless communication services in many populated areas of the world. While cellular communication systems were initially constructed to service voice communications, they are now called upon to support data communications as well. The demand for data communication services has exploded with the acceptance and widespread use of the Internet. While data communications have historically been serviced via wired connections, cellular users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created or modified to service these burgeoning data communication demands.

Cellular networks include a network infrastructure that wirelessly communicates with wireless terminals within a respective service area. The network infrastructure typically includes a plurality of base stations dispersed throughout the service area, each of which supports wireless communications within a respective cell or set of sectors. The base stations may be coupled to base station controllers (BSCs), with each BSC serving a plurality of base stations. Each BSC couples to a mobile switching center (MSC). Each BSC also typically directly or indirectly couples to the Internet.

In operation, each base station (BS) communicates with a plurality of wireless terminals operating in its cell/sectors. A BSC coupled to the base station routes voice communications between the MSC and the serving base station. The MSC routes the voice communication to another MSC or to the PSTN, for example. The BSCs route data communications between a servicing base station and a packet data network that may include or couple to the Internet. Transmissions from base stations to wireless terminals are referred to as "forward link or downlink" transmissions while transmissions from wireless terminals to base stations are referred to as "reverse link or uplink" transmissions.

Wireless links between base stations and their serviced wireless terminals typically operate according to one or more of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application.

After a wireless link is established between a base station (BS) and a wireless terminal or a mobile station (MS), the base station may communicate control information and/or system information to the mobile station. The MS may receive signals from the BS and from neighboring BSs. The MS may calculate a plurality of signal measurements that may be reported to the BS. The BS may utilize the information to allocate resources that may be utilized by the MS to communicate via the wireless network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for adaptive multi rate (AMR) and measurements downlink adaptation, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive multi rate (AMR) and measurements downlink adaptation. Aspects of a system for computing measurements for a wireless communications channel may include a processor that enables computation of at least one signal level measurement for at least one received signal. The processor may enable cancelling of at least a portion of at least one interfering signal received in addition to the received signal based on processing of a received bit sequence using a first burst process (BP) operation in a portion of a first decoding algorithm. The first decoding algorithm may utilize single antenna interference cancellation (SAIC) operations. The processor may also enable cancelling at least a portion of a noise signal received in addition to the at least one received signal based on processing the received bit sequence using a second BP operation in a portion of a second decoding algorithm. The second decoding algorithm may utilize redundancy and impose at least one physical constraint during decoding. The processor may enable adjustment of a value of the computed at least one signal level measurement.

Figure 1A:
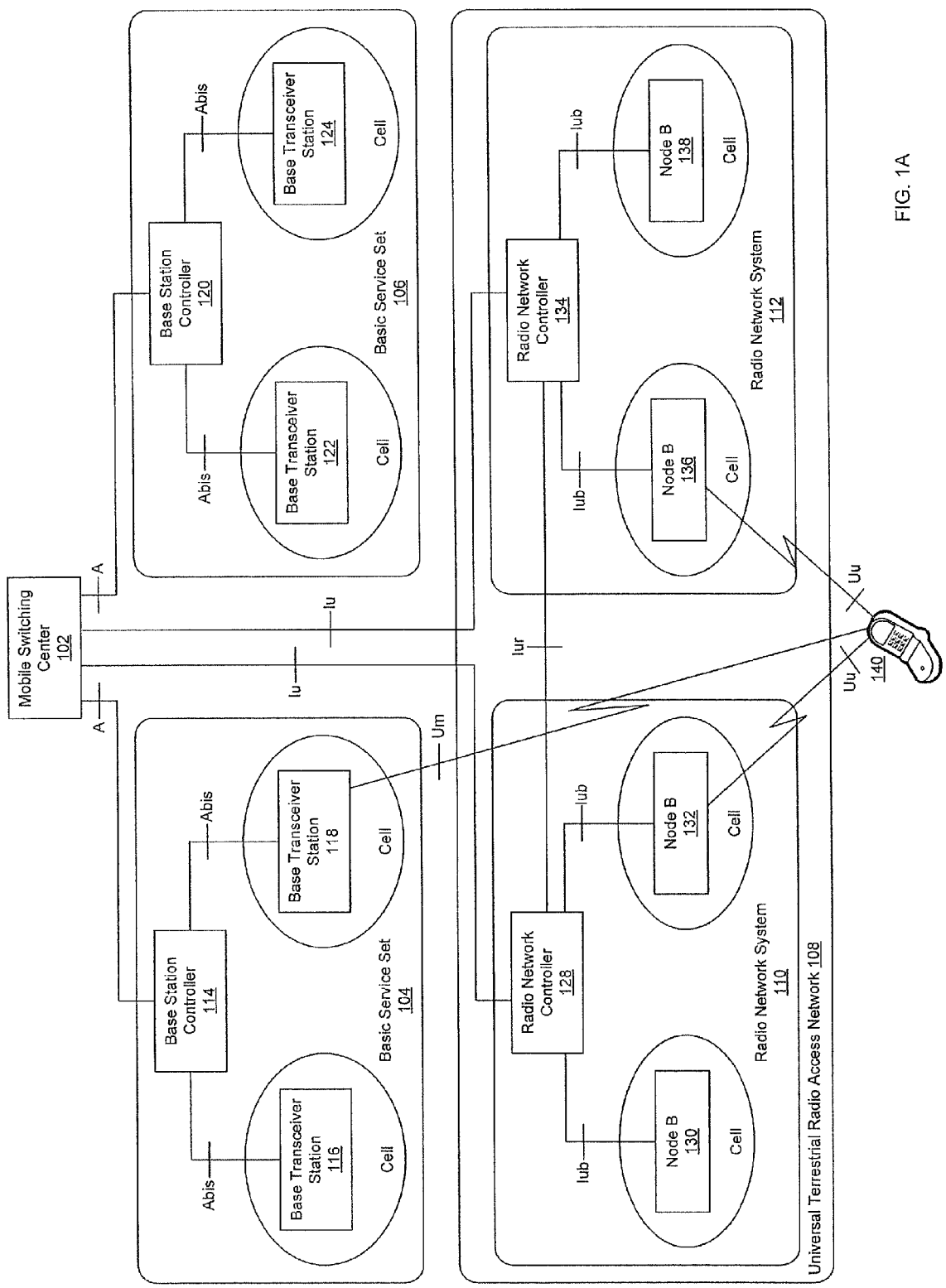
FIG. 1A illustrates an exemplary $3^{rd}$ generation GSM network, which may be utilized in connection with an embodiment of the invention.

FIG. 1A illustrates an exemplary $3^{rd}$ generation GSM network, which may be utilized in connection with an embodiment of the invention. Referring to FIG. 1A there is shown a mobile switching center (MSC) 102, a base station system (BSS) 104, a BSS 106, a universal terrestrial radio access network (UTRAN) 108, and a mobile station (MS) 140. The BSS 104 may comprise a BSC 114, a base transceiver station (BTS) 116, and a BTS 118. The BSS 106 may comprise a BSC 120, a BTS 122, and a BTS 124. The UTRAN 108 may comprise a radio network system (RNS) 110, and an RNS 112. The RNS 110 may comprise a radio network controller (RNC) 128, a node B 130, and a node B 132. The RNS 112 may comprise a RNC 134, a node B 136, and a node B 138.

The MSC 102 may be coupled to the BSC 114 via an A interface, and to the BSC 120 via an A interface. The MSC 102 may be coupled to the RNC 128 via an Iu interface. The MSC 102 may be coupled to the RNC 134 via an Iu interface. The BSC 114 may be coupled to the BTS 116 via an Abis interface. The BSC 114 may be coupled to the BTS 118 via an Abis interface. The BSC 120 may be coupled to the BTS 122 via an Abis interface and to the BTS 124 via an Abis interface. The RNC 128 may be coupled to the node B 130 via an Iub interface and to the node B 132 via an Iub interface. The RNC 134 may be coupled to the node B 136 via an Iub interface, and to the node B 138 via an Iub interface. The RNC 128 may be coupled to the RNC 134 via an Iur interface. The MS 140 may be coupled to a BTS via a Um interface. The MS 140 may be coupled to a node B via a Uu interface.

The elements of a $2^{nd}$ generation GSM network may comprise one or more MSC 102 elements, and one or more BSS 104 elements. The elements of a 3rd generation GSM network may comprise one or more MSC 102 elements, one or more BSS 104 elements, and one or more UTRAN 108 elements. The MSC 102 may comprise suitable circuitry, logic, and/or code that may be utilized to perform switching functions within at least a portion of a wireless communications network. The MSC 102 may control the operation of BSC, BTS, RNC, and/or node B elements within a GSM network that enable a subscriber utilizing an MS 140 to communicate with other subscribers on the GSM network, or with subscribers on other wireless or wired networks. The MSC 102 may control the operation of the BSC 114, and BTSs 116 and 118 via an A interface. The elements within a GSM network which may collectively controlled from the MSC via an A interface may comprise a BSS 104. The MSC 102 may control the operation of the RNC 128, and node B elements 130 and 132 via an Iu interface. The elements within a GSM network, which may collectively controlled from the MSC via an Iu interface may comprise an RNS 110. The MS 140 may communicate with a BTS 118 element via a Um interface. The MS 140 may communicate with a node B 132 element via a Uu interface.

The BSC 114 may comprise suitable circuitry, logic, and/or code that may control the operation of one or more BTS 116 elements within a BSS 104 and enable a subscriber to utilize wireless communications services within at least a portion of a service area. The area in which the subscriber may utilize the BSC 114 to receive wireless communications services may comprise a BSC area. The BSC 114 may control the operation of a BTS 116 element via an Abis interface. The BTS 116 may comprise suitable circuitry, logic, and/or code that may enable a subscriber to utilize wireless communications services within at least a portion of a BSC area. The area in which the subscriber may utilize the BTS 116 to receive wireless communications service may comprise a cell. The BTS 116 may comprise radio transceivers that may be utilized to wirelessly communicate with one or more MS 140 elements. The BTS 116 may select one or more frequencies that may be utilized to establish one or more RF channels. The RF channel(s) may be utilized to communicate with an MS 140 element. The BTS 116 may transmit information to an MS 140 element via a downlink channel. The BTS 116 may receive information from an MS 140 element via an uplink channel.

The RNC 128 may comprise suitable circuitry, logic, and/or code that may control the operation of one or more node B 130 elements within an RNS 110 and enable a subscriber to utilize wireless communications services within at least a portion of a service area. The area in which the subscriber may utilize the RNC 128 to receive wireless communications services may comprise an RNC area. The RNC 128 may control the operation of a node B 130 element via an Iub interface. The node B 130 may comprise suitable circuitry, logic, and/or code that may enable a subscriber to utilize wireless communications services within at least a portion of an RNC area. The area in which the subscriber may utilize the node B 130 to receive wireless communications service may comprise a cell. The node B 130 may comprise radio transceivers that may be utilized to wirelessly communicate with one or more MS 140 elements. The node B 130 may select one or more frequencies that may be utilized to establish one or more RF channels. The RF channel(s) may be utilized to communicate with an MS 140 element. The node B 130 may transmit information to an MS 140 element via a downlink channel. The node B 130 may receive information from an MS 140 element via an uplink channel.

The MS 140 may comprise suitable circuitry, logic, and/or code that may enable a subscriber to originate and/or receive calls and/or other services via a wireless network. The MS 140 may provide radio control management by receiving information via one or more downlink channels and/or by transmitting information via one or more uplink channels. The MS 140 may decode information received wirelessly and/or encode information to be transmitted wirelessly. The MS 140 may provide a user interface, comprising a keypad, and visual and/or audio input and output that may enable a user to originate and/or receive voice, data, and/or video communications via the wireless network. The MS 140 may provide mobility management by enabling a subscriber engaged in a call to move from an area served by a current cell to an area served by a subsequent cell without losing the ability to subsequently continue to communicate via the call.

The BTS 118, 122, and 124 may be substantially as described for the BTS 116. The BSC 120 may be substantially as described for the BSC 114. The BSS 106 may be substantially as described for the BSS 104. The node B 132, 136, and 138 may be substantially as described for the node B 130. The RNC 134 may be substantially as described for the RNC 128. The RNS 112 may be substantially as described for the RNS 110.

In operation, a subscriber may utilize the MS 140 to attempt to initiate a new call within the MSC area served by the MSC 102 via a BTS 118 element. The MSC 102 may execute call processing tasks to determine if the new call attempt will be accepted. The MSC 102 may utilize the A interface to receive information in connection with the attempted call initiation from a BSC 114 element. The information may identify the location of the subscriber by indicating a specific cell associated with a BTS 118 element that received the request from the MS 140 associated with the new call attempt. If the attempted call is accepted, the MSC 102 may store information associating the accepted new call with resources utilized in the corresponding BSC area served by the BSS 104 element. The MSC 102 may indicate to the BSC 114 element that the new call attempt is to be accepted via the A interface.

In response, the BSC 114 element may allocate resources at the corresponding BTS 118 element, such as a transceiver assignment and one or more downlink and/or uplink frequency assignments, which may be utilized for communicating with the MS 140. The BSC 114 element may also assign transmitting power levels that may be utilized during communications between the BTS 118 element and the MS 140 via an assigned RF channel. The BSC 114 element may communicate these assignments to the corresponding BTS 118 element via the Abis interface. The BTS 118 element may subsequently utilize the assigned resources when communicating with the MS 140 via the Um interface. The MS 140 may utilize time division multiple access (TDMA) when utilizing an RF channel to communicate with the BTS 118 via the Um interface.

A subscriber may utilize the MS 140 to attempt to initiate a new call within the MSC area served by the MSC 102 via a node B 132 element. The MSC 102 may utilize the Iu interface to receive information in connection with the attempted call initiation from an RNC 128 element. The information may identify the location of the subscriber by indicating a specific cell associated with a node B 132 element that received the request from the MS 140 associated with the new call attempt. If the attempted call is accepted, the MSC 102 may indicate to the RNC 128 element that the new call attempt is to be accepted via the Iu interface.

In response, the RNC 128 element may allocate resources at the corresponding node B 132 element, such as a transceiver assignment and one or more downlink and/or uplink frequency assignments, which may be utilized for communicating with the MS 140. The RNC 128 element may also assign transmitting power levels and/or one or more orthogonal variable spreading factor (OVSF) codes that may be utilized during communications between the node B 132 element and the MS 140 via an assigned RF channel. The RNC 128 element may communicate these assignments to the corresponding node B 132 element via the Iub interface. The node B 132 element may subsequently utilize the assigned resources when communicating with the MS 140 via the Uu interface. The MS 140 may utilize wideband code division multiple access (W-CDMA) when utilizing an RF channel to communicate with the node B 132 element via the Uu interface.

One or more of the node B elements and/or BTS elements may transmit a beacon signal within the corresponding cell served by the element. The beacon signal may comprise information that identifies the wireless network, and/or identifies the BTS element, for example. The beacon signal may be transmitted by the corresponding node B and/or BTS elements via a corresponding broadcast control channel (BCCH), for example. The beacon signal may comprise a training sequence that may be utilized by the MS 140 to compute measurements associated with each received beacon signal, for example. These measurements may comprise computation of a signal level that measures the strength of the received beacon signal, and/or computation of a signal quality that measures a bit error rate (BER), for example. The MS 140 may generate a measurement report that comprises computed measurements from signals received via one or more BCCHs. The MS 140 may transmit the measurement report to a BTS 118 element via a Um interface, or to a node B 132 element via a Uu interface, which has currently assigned resources for communicating with the MS 140.

The node B 132 element may communicate the received measurement report to the RNC 128 via the Iub interface. Based on the contents of the measurement report, the RNC 128 may reassign resources assigned to the MS 140. If, for example, the RNC 128 determines that the MS 140 received a signal from a subsequent transceiver that was a better signal than the one received from the currently assigned transceiver, the RNC 128 may assign resources on the subsequent transceiver to subsequently communicate with the MS 140, and deassign corresponding resources from the currently assigned transceiver. The RNC 128 may determine one signal to be a better signal than another signal by comparing corresponding signal level and/or signal quality measurements contained in the received measurement report. The reassignment of resources for communicating with an MS 140 during an established call may be referred to as a handover.

The currently assigned transceiver and subsequently assigned transceiver may be located in a common node B 132 element. When the currently and subsequently assigned transceivers are located within a common node B 132 element the RNC 128 may communicate instructions related to the handover via the Iub interface to the node B 132 element. The currently assigned transceiver may be located in a current node B 132 element and the subsequently assigned transceiver may be located in a subsequent node B 130 element. When the currently and subsequently assigned node B elements are located within a common RNS 110, the RNC 128 may communicate instructions related to the handover to each of the node B elements via the corresponding Iub interface. The RNC 128 may communicate instructions related to the handover to the MSC 102 via the Iu interface.

The currently assigned transceiver may be located in a current node B 132 element within a current RNS 110 and the subsequently assigned transceiver may be located in a subsequent node B 136 element within a subsequent RNS 112. When the currently and subsequently assigned node B elements are located within different RNS areas, the RNC 128 element in the current RNS 110 may communicate the instructions related to handover to the RNC 134 element in the subsequent RNS 112 via the Iur interface. The RNC 128 element in the current RNS 110 may also communicate instructions related to the handover to the node B 132 element within the current RNS 110 via the corresponding Iub interface. The RNC 134 element in the subsequent RNS 112 may also communicate instructions related to the handover to the node B 136 element within the subsequent RNS 112 via the corresponding Iub interface. The RNC 128 and/or RNC 134 may communicate instructions related to the handover to the MSC 102 via a corresponding Iu interface.

The BTS 118 element may communicate the received measurement report to the BSC 114 via the Abis interface. Based on the contents of the measurement report, the BSC 114 may reassign resources assigned to the MS 140. If, for example, the BSC 114 determines that the MS 140 received a signal from a subsequent transceiver that was a better signal than the one received from the currently assigned transceiver, the BSC 114 may assign resources on the subsequent transceiver to subsequently communicate with the MS 140, and deassign corresponding resources from the currently assigned transceiver.

The currently assigned transceiver and subsequently assigned transceiver may be located in a common BTS 118 element. When the currently and subsequently assigned transceivers are located within a common BTS 118 element the BSC 114 may communicate instructions related to the handover via the Abis interface to the BTS 118 element. The currently assigned transceiver may be located in a current BTS 118 element and the subsequently assigned transceiver may be located in a subsequent BTS 116 element. When the currently and subsequently assigned BTS elements are located within a common BSS 104, the BSC 114 may communicate instructions related to the handover to each of the BTS elements via the corresponding Abis interface. The BSC 114 may communicate instructions related to the handover to the MSC 102 via the A interface.

The currently assigned transceiver may be located in a current BTS 118 element within a current BSS 104 and the subsequently assigned transceiver may be located in a subsequent BTS 122 within a subsequent BSS 106, or in a subsequent node B element 136 within a subsequent RNS 112. The BSC 114 element in the current BSS 104 may communicate the instructions related to handover to the MSC 102 via the A interface. The BSC 114 element in the current BSS 104 may also communicate instructions related to the handover to the BTS 118 element within the current BSS 104 via the corresponding Abis interface.

The MSC 102 may communicate instructions related to the handover to the BSC 120 in the subsequent BSS 106 via the A interface, or to the RNC 134 element in the subsequent RNS 112 via the Iur interface. The BSC 120 element in the subsequent BSS 106 may communicate instructions related to the handover to the BTS 122 element within the subsequent BSS 106 via the corresponding Abis interface. The RNC 134 element in the subsequent RNS 112 may communicate instructions related to the handover to the node B 136 element within the subsequent RNS 112 via the corresponding Iub interface. The BSC 114 element and/or BSC 120 element may communicate instructions related to the handover to the MSC 102 via a corresponding A interface. The RNC 134 element may communicate instructions related to the handover to the MSC 102 via a corresponding Iu interface.

Figure 1B:
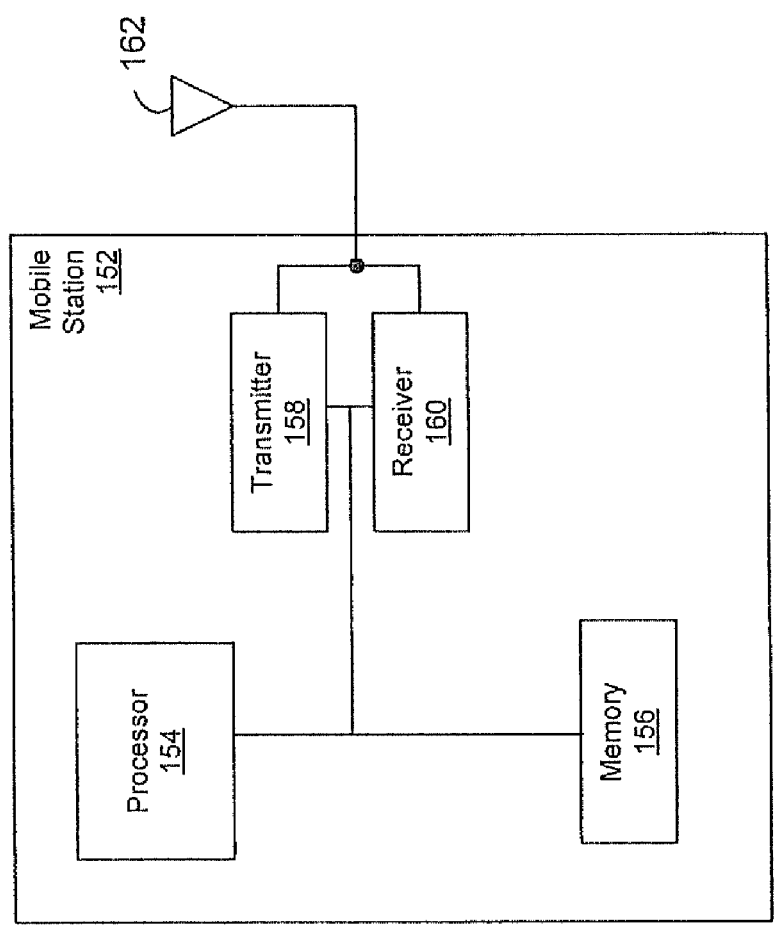
FIG. 1B is a block diagram of an exemplary mobile station, which may be utilized in connection with an embodiment of the invention.

FIG. 1B is a block diagram of an exemplary mobile station, which may be utilized in connection with an embodiment of the invention. Referring to FIG. 1B, there is shown a mobile station (MS) 152, and an antenna 162. The mobile station may comprise a processor 154, memory 156, a transmitter 158, and a receiver 160. The processor 154 may comprise suitable logic, circuitry, and/or code that may enable processing of information and/or data associated with the transmission and reception of signals at the MS 152. The processor 154 may, for example, compute signal level measurements and/or signal quality measurements based on received signals. The processor 154 may also select a coding and/or decoding rate associated with signals that may be transmitted and/or received via an RF channel. The memory 156 may comprise suitable logic, circuitry, and/or code that may be utilized to store data and/or control information that may be utilized in the operation of at least a portion of the MS 152. For example, the memory 156 may be utilized to store intermediate results of calculations related to the computation of signal level measurements and/or signal quality measurements. The memory 156 may also be utilized to store configuration information related to a coding and/or decoding rate that may be utilized to receive signals at the MS 152.

The transmitter 158 may comprise suitable circuitry, logic, and/or code that may be utilized to transmit signals wirelessly. The transmitter 158 may perform coding functions, signal modulation, and/or signal amplification. The receiver 160 may comprise suitable circuitry, logic, and/or code that may be utilized to receive wireless signals. The receiver 160 may perform decoding functions, signal demodulation, and/or signal amplification. The antenna 162 may comprise suitable circuitry, logic, and/or code that may enable the reception and transmission of wireless signals.

Figure 2:
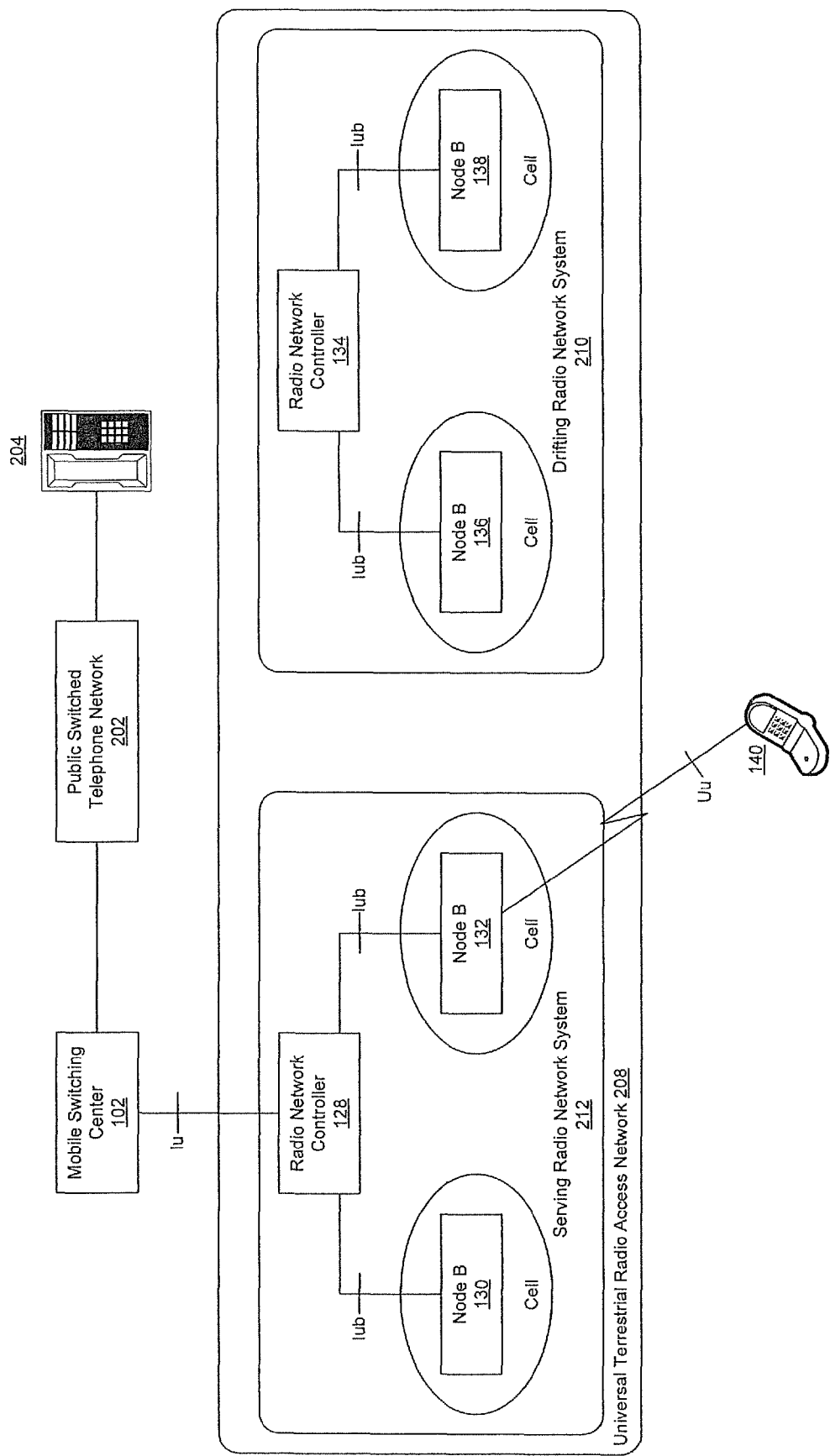
FIG. 2 illustrates exemplary communication services via a $3^{rd}$ generation GSM network and PSTN, which may be utilized in connection with an embodiment of the invention.

FIG. 2 illustrates exemplary communication services via a $3^{rd}$ generation GSM network and PSTN, which may be utilized in connection with an embodiment of the invention. Referring to FIG. 2 there is shown an MSC 102, a public switched telephone network (PSTN) 202, a telephone 204, UTRAN 208, and an MS 140. The UTRAN 208 may comprise a drifting RNS 210, and a serving RNS 212. The drifting RNS 210 may comprise a radio network controller (RNC) 128, a node B 130, and a node B 132. The serving RNS 212 may comprise a RNC 134, a node B 136, and a node B 138. The UTRAN 208 may be substantially as described for the UTRAN 108. The drifting RNS 210 and serving RNS 212 may be substantially as described for the RNS 112.

The PSTN 202 may comprise suitable circuitry, logic, and/or code that may enable a subscriber to utilize a plurality of communications services via a wired network. The communications services may include plain old telephone service (POTS) voice communications services, integrated services digital network (ISDN) services, packet switched public data network services, circuit switched public data network services, and/or video communications services. The telephone 204 may comprise suitable circuitry, logic, and/or code that may enable a subscriber to access at least a portion of the communications services available from the PSTN. A wireless communications network subscriber may access the PSTN via an MSC 102.

In operation, a wireless communications network subscriber utilizing an MS 140 may originate a call to a subscriber on a PSTN 202 that may be delivered to the subscriber at the telephone 204. The serving RNS 212 may comprise a node B 132 element and an RNC 128 element from which resources were allocated at the time that the call from the MS 140 was originated. The MSC 102 may also allocate resources that may be utilized to communicatively couple the allocated resources within the serving RNS 212 and the PSTN 202. The PSTN 202 may allocate resources for establishing a communication path to the telephone 204. The PSTN 202 may allocate resources to communicatively couple the communication path to the telephone 204 to the allocated resources within the serving RNS 212. A communication path may be established for a call between the MS 140 and the telephone 204. The communication path may comprise the node B 132 element, the RNC 128 element, the MSC 102 element, and the PSTN 202. Information communicated via the call path may be received from and/or delivered to the MS 140 via a traffic channel (TCH). The TCH may utilize the Uu interface to communicatively couple the node B 132 element and the MS 140.

During the established call, the MS 140 may encode and decode information transmitted and/or received via the TCH. The MS 140 may transmit information that is encoded utilizing a plurality of information binary bits. In addition, the MS 140 may append a subsequent plurality of redundant binary bits. The MS 140 may transmit an aggregate number of bits comprising the plurality of information binary bits, and the subsequent plurality of redundant binary bits. The redundant binary bits may be utilized at a decoder in a receiver to detect and/or correct errors that may have changed a binary value of at least one of the plurality of information binary bits that were transmitted by the MS 140. The number of transmitted information binary bits and redundant binary bits may be based on a coding rate utilized by the MS 140. The coding rate may be assigned by the RNC 128 element in the serving RNS 212. Similarly, the MS 140 may decode information received via the TCH. The MS 140 may decode the received information by utilizing a decoding rate as assigned by the RNC 128 element in the serving RNS 212. An MS 140 that utilizes adaptive multi rate (AMR) coding and/or decoding may adaptively change the coding and/or decoding rate during the course of the established call.

Within the duration of the established call, the subscriber utilizing the MS 140 may be mobile. The MS 140 may receive signals via a BCCH from each of at least a portion of a plurality of node B elements 130, 132, 136, and 138. The MS 140 may compute measurements associated with each signal received via the corresponding BCCH. The MS may also compute measurements associated with the signal received via the TCH. The measurements may comprise signal level measurements, and signal quality measurements. In various embodiments of the invention, the MS 140 may cancel at least a portion of interference in the signal received via the TCH. The cancellation of interference may utilize single antenna interference cancellation (SAIC) operations. The MS 140 may compute a signal to noise ratio (SNR) measurement. The MS 140 may cancel at least a portion of noise in the received signal. The cancellation of noise may utilize redundancy in the received signal and may impose at least one physical constraint during the decoding of the received signal. The SNR measurement may be adjusted to reflect signal improvement based on the at least partial noise cancellation and/or interference cancellation in the received signal. Based on the adjusted SNR measurement, the AMR enabled MS 140 may select a coding and/or decoding rate. The selected coding and/or decoding rate may be different from the current coding and/or decoding rate.

The MS 140 may transmit a measurement report to the node B 132 element within the serving RNS 212. The measurement report may comprise computed measurements associated with at least a portion of the received BCCH signals, and with the TCH signal. Each computed set of measurements may be associated with an identifier that indicates the node B 132 element that transmitted the measured signal. The measurement report may be sent from the MS 140 to the node B 132 element within the serving RNS 212 via a slow associated control channel (SACCH) on an uplink RF channel associated with the Uu interface. The MS 140 may also transmit an AMR adaptation request to the RNC 128 element Within the serving RNS 212. The AMR adaptation request may comprise a request from the MS 140 to utilize the selected coding and/or decoding rate based on the adjusted SNR measurement. The AMR adaptation request may also be sent via the SACCH. Even in the absence of a handover, the serving RNS 212 may change the allocation of resources utilized for communicating with the MS 140 during the established call. For example, in response to a received measurement report from the MS 140, the RNC 128 element within the serving RNS 212 may change one or more power levels associated with one or more uplink or downlink RF channels. In response to an AMR rate adaptation request from the MS 140, the RNC 128 element may also change a coding rate and/or decoding rate associated with information transmitted via one or more of the uplink and/or downlink RF channels.

Figure 3:
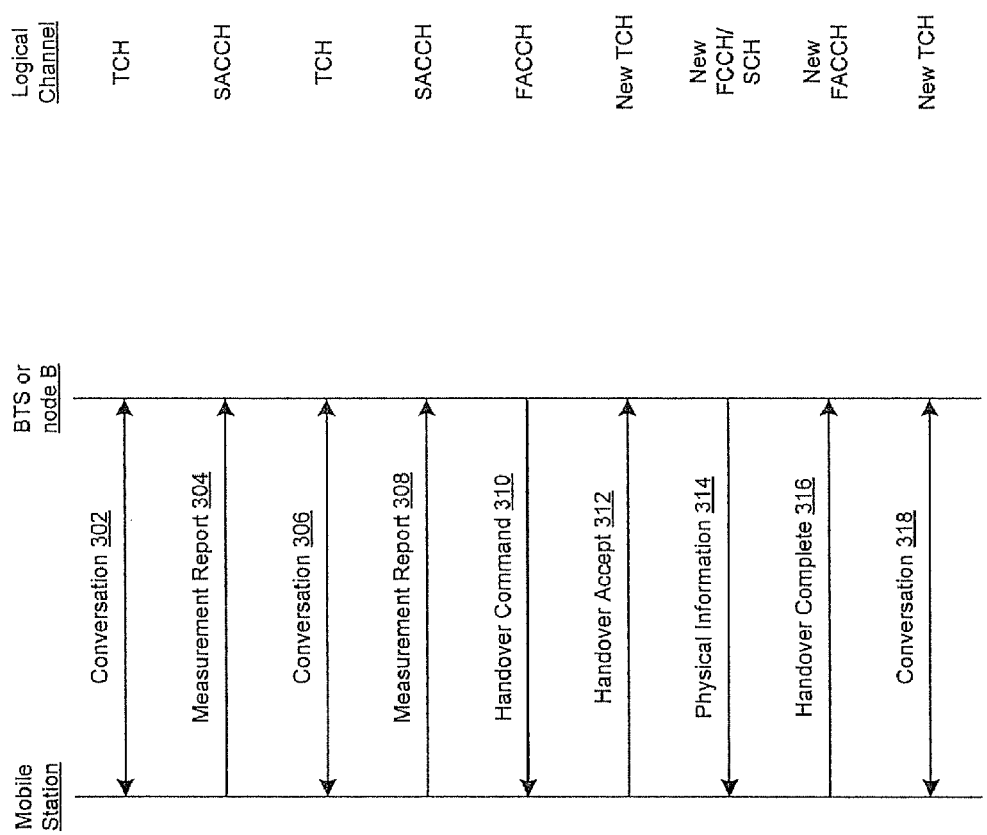
FIG. 3 is a flow diagram illustrating exemplary exchanges of messages between a mobile station and a wireless network leading to a handover operation, in connection with an embodiment of the invention.

FIG. 3 is a flow diagram illustrating exemplary exchanges of messages between a mobile station and a wireless network leading to a handover operation, in connection with an embodiment of the invention. Referring to FIG. 3, in step 302, conversation associated with the established call is exchanged between the MS 140 and a node B 132 element via a TCH. In step 304, the MS 140 may communicate a measurement report to the node B 132 element via a SACCH. The measurement report may comprise one or more adjusted signal level measurements and/or one or more adjusted signal quality measurements. The processor 154 may compute the measurements based on signals received from one or more BTS 118 elements and/or one or more node B 132 elements. In various embodiments of the invention, the signal level measurements and/or signal quality measurements may be adjusted based on cancellation of at least a portion of received interfering signals and/or noise signals. The processor 154 may also compute a SNR level associated with a received TCH. In various embodiments of the invention, the SNR level may be adjusted based on cancellation of received noise signals. The adjusted SNR level may be utilized to select a coding and/or decoding rate. The selected coding and/or decoding rate may also be sent as a request to the node B 132 element via a SACCH. If no handover is initiated in response to the measurement report, in step 306, conversation may continue to be exchanged between the MS 140 and the node B 132 element via the TCH. In step 308, the MS 140 may communicate a subsequent measurement report to the node B 132 element via the SACCH.

In step 310, the node B 132 element may communicate a handover command to the MS 140 via a fast associated control channel (FACCH). The handover command may comprise information indicating a new TCH and/or new cell to be utilized subsequent to the handover. In step 312, the MS 140 may communicate a handover accept message in response to the handover command. The handover accept message may be transmitted to the node B 136 element within the drifting RNS 210 via the new TCH. In step 314, physical information may be transmitted from the node B 136 element to the MS 140. The physical information may comprise timing and frequency correction information that may be utilized to synchronize the MS 140 to the drifting RNS 210. The physical information may be transmitted via a new frequency correction channel (FCCH) and/or synchronization channel (SCH) associated with the drifting RNS 210. In step 316, a handover complete message may be communicated from the MS 140 to the node B 136 element via a new FACCH associated with the drifting RNS 210. In step 318, conversation may resume via the new TCH.

Figure 4:
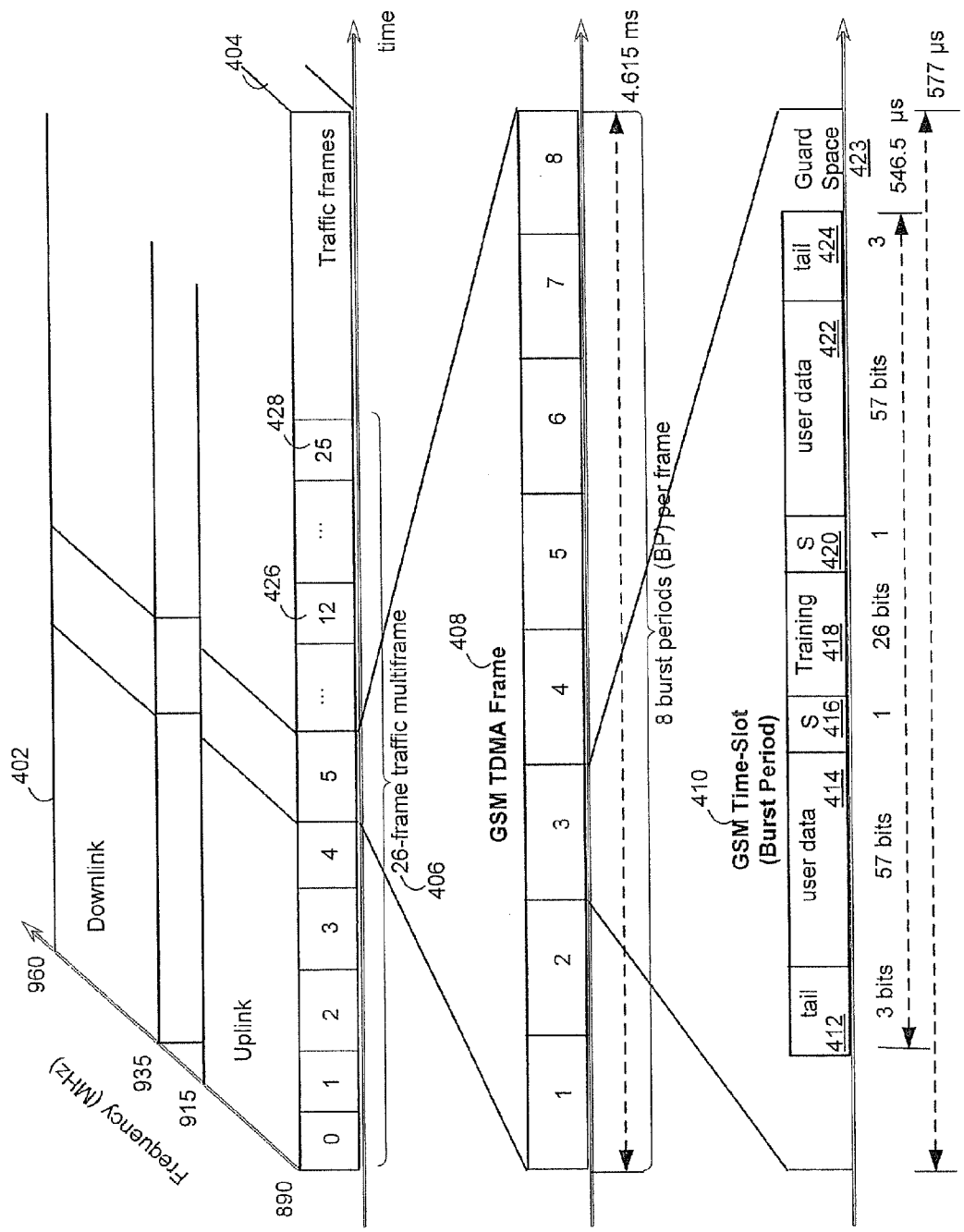
FIG. 4 is a graph illustrating an exemplary GSM frame and a burst period, which may be used in connection with an embodiment of the invention.

FIG. 4 is a graph illustrating an exemplary GSM frame and a burst period, which may be used in connection with an embodiment of the invention. GSM utilizes a combination of Time and Frequency Division Multiple Access (TDMA/FDMA). Referring to FIG. 4, there is shown a downlink frequency band 402, an uplink frequency band 404, a GSM TDMA frame 408 and a GSM timeslot or burst period 410. The GSM downlink frequency band 402 comprises a range of frequencies spanning 935-960 MHz, for example. The GSM uplink frequency band 404 comprises a range of frequencies spanning 890-915 MHz, for example. The FDMA aspect of GSM involves the division of frequency of the 25 MHz bandwidth for the uplink frequency band 404 and the downlink frequency band 402 into 124 carrier frequencies respectively, each of which comprises a bandwidth of 200 kHz. One or more carrier frequencies may be assigned per base station. The TDMA aspect of GSM involves the division in time of each carrier frequency into 8 time-slots, or burst periods (BPs), such as BP 410. Timeslots associated with a downlink channel may be utilized by a BTS 118 element and/or a node B 132 element to transmit information to an MS 140. Timeslots associated with an uplink channel may be utilized by an MS 140 to transmit information to a BTS 118 element and/or a node B 132 element.

The GSM timeslot or BP 110 may comprise tail portions 412 and 424, user data portions 414 and 422 stealing bits 416 and 420, a training sequence 418, and guard space 423. The tail portions 412 and 424 may each comprise 3 bits, for example, and may be utilized as separators. The user data portions 414 and 422 may each comprise 57 bits, for example, and may be used for data transmission. The stealing bits 416 and 420 may each comprise 1 bit and may be used by fast associated control channel (FACCH) messages. The training sequence 418 may comprise 26 bits, for example, and may be utilized by an MS 140 to synchronize and compensate for time dispersion produced by multipath propagation. The guard space 423 may comprise a total of 8.25 bits, for example, and may allow for propagation time delay in the arrival of bursts. The burst period 410 may be transmitted in 0.577 milliseconds.

Each group of 8 time-slots or burst periods, such as the burst period 410, may form a GSM TDMA frame 408. The GSM frame 408 may be transmitted every 4.615 ms. GSM frames, such as the GSM frame 408, may be further grouped into multiframes. A GSM multiframe may comprise 26 TDMA frames or 51 TDMA frames. A GSM multiframe that is utilized to communicate information via a traffic channel, for example a TCH, may comprise 26 TDMA frames. A GSM multiframe that is utilized to communicate information via a control channel, for example a BCCH, may comprise 51 TDMA frames. For example, the GSM multiframe 406 may comprise 26 TDMA frames, numbered 0, 1, . . . , 25. The 26-frame multiframe 406 may comprise 24 traffic channels (TCH), which may be communicated in frames 0, 1, . . . , 11 and frames 13, 14, . . . , 24. The $13^{th}$ frame 426 may be used to communicate information via the SACCH. The $25^{th}$ frame 428 may comprise an idle frame that is not utilized to communicate information. During the $25^{th}$ frame 428 within a GSM multiframe 406, a frame associated with the corresponding GSM multiframe utilized to communicate information via a control channel may be transmitted. Thus, for example, an MS 140 that receives the GSM traffic multiframe, via a TCH downlink frequency may retune to a BCCH downlink frequency to receive a frame from the GSM control multiframe during transmission of the $25^{th}$ frame 428 within the GSM. The aggregate number of frames that may be transmitted during the transmission of a complete GSM control multiframe may comprise 1,326 frames. The block of 1,326 frames, comprising traffic frames and control frames, may be referred to as a superframe.

Figure 5:
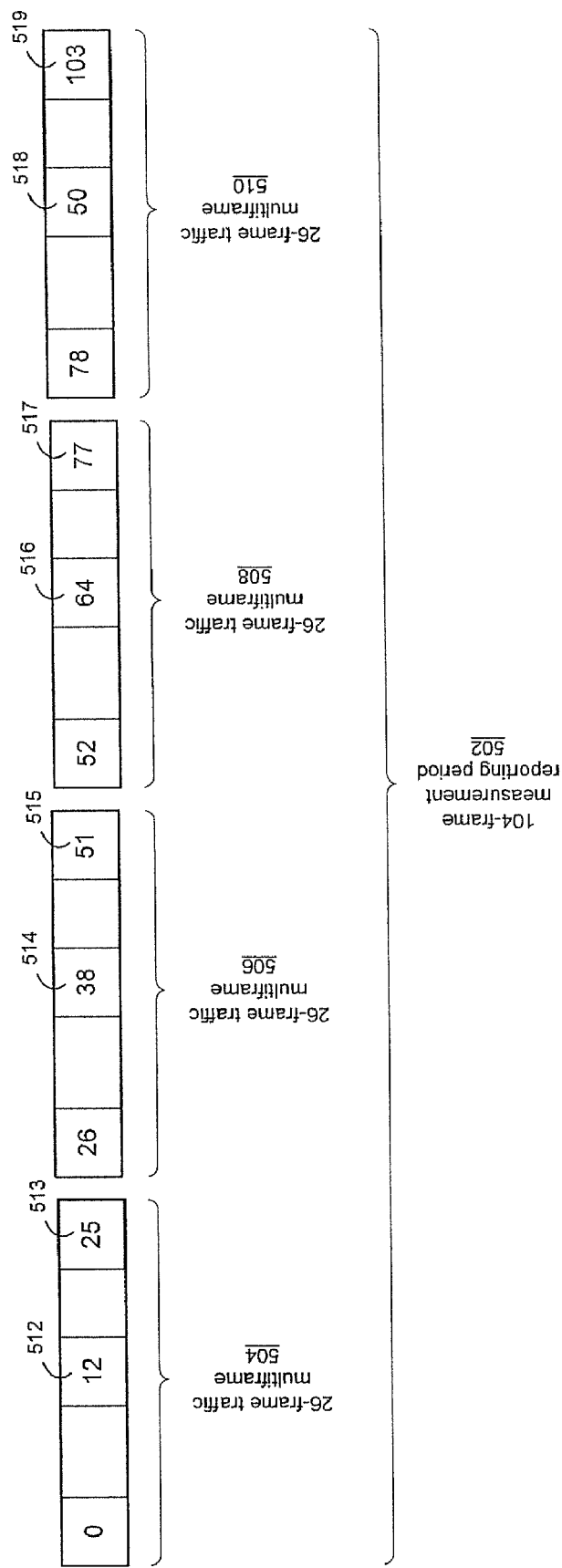
FIG. 5 is a diagram illustrating an exemplary signal measurement interval, in connection with an embodiment of the invention.

FIG. 5 is a diagram illustrating an exemplary signal measurement interval, in connection with an embodiment of the invention. Referring to FIG. 5, there is shown a 104 frame measurement reporting period 502, a first 26 frame traffic multiframe 504, a second 26 frame traffic multiframe 506, a third 26 frame traffic multiframe 508, and a fourth 26 frame traffic multiframe 510. Also shown in FIG. 5 is a plurality of SACCH message frames 512, 514, 516, and 518, and a plurality of idle frames 513, 515, 517, and 519. The 104-frame measurement reporting period 502 may also be referred to as a SACCH multiframe.

The plurality of SACCH message frames comprising 512, 514, 516 and 518 may be utilized transmit a complete measurement report. If, for example, the first portion of the measurement report is communicated during SACCH message frame 512, the measurements reported may be computed based on signals received during the preceding measurement reporting period starting from frame 0 in the previous measurement reporting period and ending at frame 103. If, for example, the first portion of the measurement report is communicated during the SACCH message frame 514, the measurements reported may be computed based on signals received during the previous measurement reporting period starting from frame 13 in the previous measurement reporting period and ending in frame 12 in the current measurement reporting period. The MS 140 may communicate an uplink SACCH message to a BTS 118 element or to a node B 132 element via uplink channel.

In various embodiments of the invention, the MS 140 may compute a signal level measurement for a signal received via a Uu interface or via a Um interface. When a signal is received via a Um interface, the signal level measurement may compute a value for the parameter sig_lev. The MS 140 may adjust the value of the sig_lev parameter to compute an adj_sig_lev value. In various embodiments of the invention, the value adj_sig_lev may be about 2 decibels (dB) greater than the value sig_lev, for example. The MS 140 may report a value RXLEV in a measurement report. The value RXLEV may be based on an average of values of adj_sig_lev, avg(adj_sig_lev), received over a measurement reporting period. The value RXLEV may represent a range of values for the value avg(adj_sig_lev). For example, for a range of values avg (adj_sig_lev) below a low threshold value, RXLEV may equal 0. For a range of values avg(adj_sig_lev) above a high threshold value, RXLEV may equal 63, for example. For values of avg(adj_sig_lev) that fall within ranges between the low threshold and high threshold, the value of RXLEV may be greater than 0 and less than 63, for example.

In various embodiments of the invention, a signal received via the Uu interface or via the Um interface may utilize discontinuous transmission (DTX). DTX enables a MS 140 or BTS 118 element or node B 132 element to reduce the rate of information transmission via the Um interface or Uu interface when there is an absence of conversation in an established call. During these periods, comfort noise may be transmitted via the Um or Uu interface.

When DTX is enabled in a wireless communications network, a value avg(adj_sig_lev) may not properly represent actual received values because the signal level of the comfort noise intervals may be computed with the average. To compensate, the MS may compute an average adj_sig_lev over a subset of the frames received in the measurement reporting period. This subset may comprise a subset of frames in which conversation was actually received during the measurement reporting period. The corresponding value that may be reported in a measurement report is the value RXLEV_SUB.

The processor 154 within the MS 152 may compute a signal quality measurement based on a bit error rate (BER) associated with the decoded received signal. The BER may be averaged over the measurement reporting period to derive a value avg(BER). The MS 140 may report a value RXQUAL in a measurement report. The value RXQUAL may be based on the value avg(BER). If the processor 154 cancels at least a portion of noise in the signal received via the Um interface by utilizing a decoding algorithm that utilizes redundancy in the received signal and imposes at least one physical constraint during the decoding, the MS 140 may adjust the value of BER to compute an adj_BER value. The value RXQUAL may represent a range of values for the value avg(adj_BER). For example, for a range of values avg(adj_BER) below a low threshold value, RXQUAL may be equal to 0.14%. For a range of values avg(adj_BER) above a high threshold value, RXQUAL may equal 18.1%, for example. For values of avg (adj_BER) that fall within ranges between the low threshold and high threshold, the value of RXQUAL may be greater than 0.14% and less than 18.1%, for example. When DTX is enabled, the MS 140 may compute a corresponding signal quality measurement RXQUAL_SUB based on an adj_BER average computed over a subset of frames. The subset of frames may be determined substantially as described for the computation of RXLEV_SUB.

If the value of an individual BER measured during a portion of the measurement reporting period has a value, which may be below a cancellation threshold, the value of the individual BER may not be adjusted. For example, a BER may be computed over a 20 millisecond (msec) speech block. If the value of the BER is below 50 errors/speech block, the value of the BER may not be adjusted. If the value of the BER is greater than or equal to 50 errors/speech block but less than 70 errors/speech block, an adj_BER value of 50 errors/speech block may be computed. If the BER is greater than 70 errors/speech block, an adj_BER value of 70 errors/speech block may be computed. The value RXQUAL or RXQUAL_SUB may be based on an average the comprises a combination of individual BER values and adj_BER values measured over individual speech blocks received during the measurement reporting period.

When a signal is received via a Uu interface, the signal level measurement may compute a received signal strength indicator (RSSI) over the measurement reporting period. The RSSI value may be reported by the MS 140 in a measurement report. When DTX is enabled, the RSSI value may be computed over a subset of frames received in the measurement reporting period. The subset of frames may be determined substantially as described for the computation of RXLEV_SUB. The signal quality measurement may compute a block error rate (BLER).

When the MS 140 receives a signal from a UTRAN 108 that utilizes CDMA 2000 (code division multiple access) technology, the signal level measurement may compute a pilot strength value (PILOT_STRENGTH). The PILOT_STRENGTH value may be reported by the MS 140 in a measurement report. When a signal is received from a UTRAN 108 that utilizes FDMA or TDMA technology, the signal level measurement may compute a received signal code power (RSCP) level and/or an energy per modulating bit to noise spectral density ratio (Ec/No).

A processor 154 within the MS 152 may measure a signal to interference plus noise ratio (SINR) associated with a signal received via a TCH, for example. If a processor 154 within the MS 152 cancels at least a portion of interference in the signal received via the Um interface by utilizing SAIC operations, the MS 140 may compute a signal to noise ratio (SNR). If the processor 154 cancels at least a portion of noise in the SAIC processed signal by utilizing a decoding algorithm that utilizes redundancy in the received signal and imposes at least one physical constraint during the decoding, the MS 140 may adjust the value of the SNR to compute an adj_SNR value. In various embodiments of the invention, the adj_SNR value may comprise an improvement of about 2.5 dB when compared to the SINR value.

In various embodiments of the invention, the improvement represented by the adj_SNR value may enable the MS 140 to request an adaptation to the coding and/or decoding rate associated with information communicated via the TCH. AMR may enable a MS 140 to select from a plurality of information transfer rates. For example, AMR may enable an information transfer rate of 12.2 kbit/sec, or 7.95 kbit/sec. Based on the adj_SNR value, the MS 140 may send a codec mode request message, as defined in the 3GPP TS 45.009 specification for example, to an RNC 128 element or a BSC 114 element via a SACCH. The MS 140 may request an adaptation in the information transfer rate current being utilized via the codec mode request message. By utilizing the adj_SNR value, instead of the unadjusted SNR value, the MS 140 may enable the RNC 128 element or BSC 114 element to permit a higher information transfer rate via the TCH. As a result, the subscriber utilizing the MS 140 may realize a higher voice quality in received and transmitted conversation to/from the MS 140.

Figure 6:
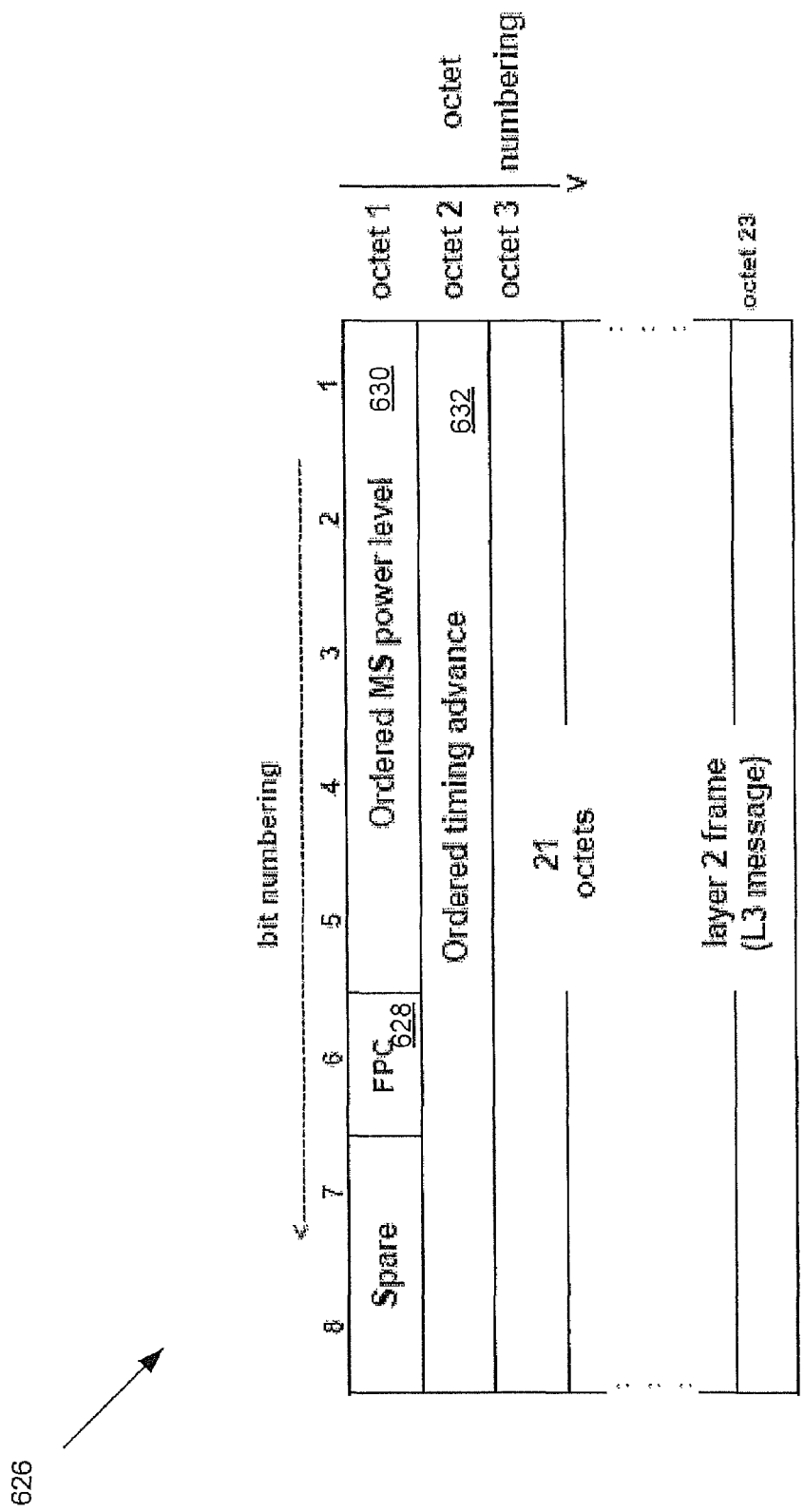
FIG. 6 is a block diagram of an exemplary uplink slow associated control channel (SACCH) block, which may be used in accordance with an embodiment of the invention.

FIG. 6 is a block diagram of an exemplary uplink slow associated control channel (SACCH) block, which may be used in accordance with an embodiment of the invention. An uplink SACCH block may be communicated by an MS 140 to a BTS 118 element or to a node B 132 element. Referring to FIG. 6, the SACCH block 626 may comprise 23 octets for a total of 184 bits. Octets 1 and 2 may comprise level 1 (L1)

control information and octets 3, 4, ..., 23 may comprise level 3 (L3) system information. The L1 control information may comprise fast power control (FPC) bit information 628, ordered mobile station power level 630, and ordered timing advance 632. The spare bits within the SACCH block 626 may be encoded with the binary value 0, for example.

The FPC bit 628 may have a different interpretation depending on the channel mode of the channel to which the SACCH 626 is associated. For example, if the channel mode for a wireless connection is such that FPC may be used, the FPC bit 628 may indicate whether Fast Measurement Reporting and Power Control mechanism may be used. The FPC bit 628 may be coded as 0 when fast power control is not used, and 1 when fast power control is in use.

The ordered mobile station (MS) power level 630 may be used by a base station, for example, to indicate a desired transmission power level to an associated mobile station. The ordered timing advance information 632 may be communicated from a base station (BS) to an associated MS and may be used by the MS to advance its timings of transmissions to the BS so as to compensate for propagation delay.

During wireless communication of data between a BS and a MS, L3 system information in octets 3, ..., 23 may stay unchanged. In instances when the MS is in handover or when receiving short messages, for example, L3 system information in the SACCH block 626 may change. In this regard, a continuous transmission of SACCH blocks in both uplink and downlink paths may be essential to proper exchange of data for an established wireless connection or for a wireless connection in handover. For example, an uplink path may be used by a MS to communicate measurement result messages to the BS via the SACCH 626. Similarly, a downlink path may be used by the BS to communicate system information and measurement messages to the MS via the SACCH 626.

Figure 7:
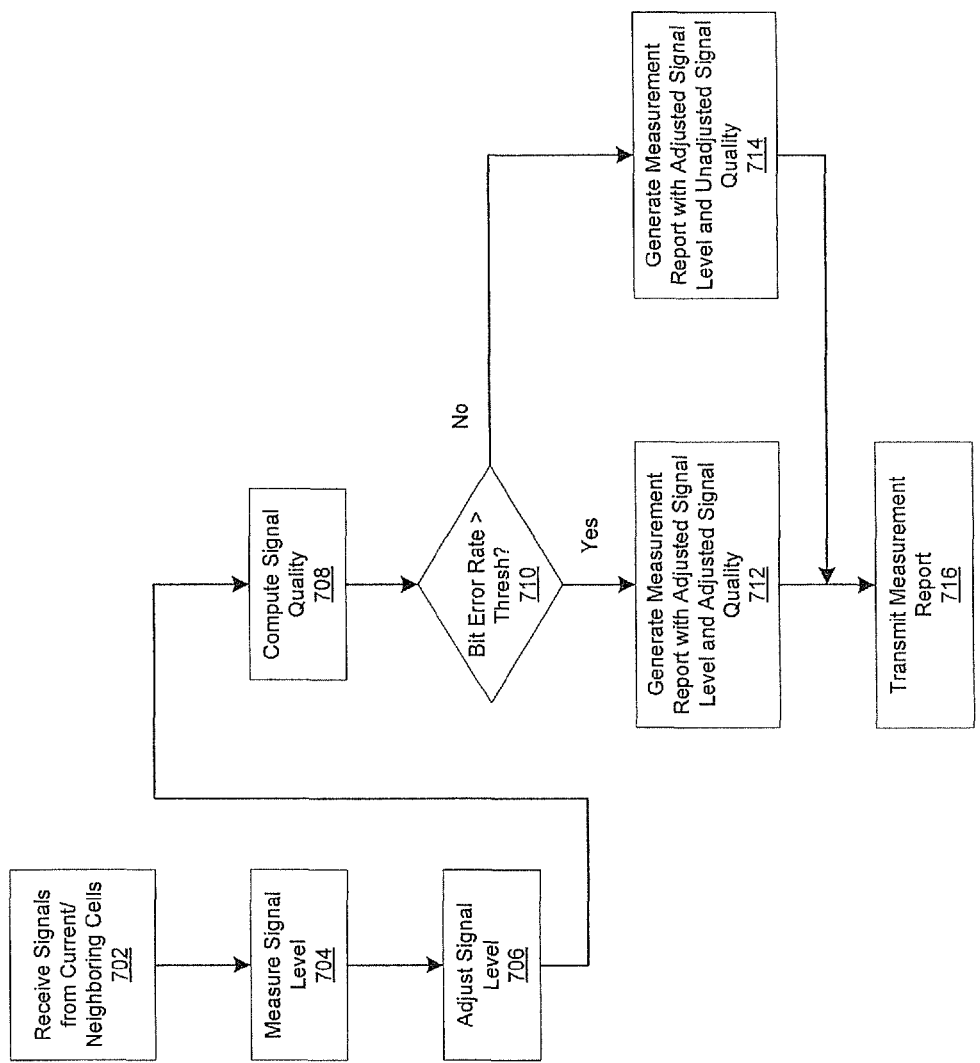
FIG. 7 is a flow diagram illustrating exemplary steps for adjustment of reported measurements, in accordance with an embodiment of the invention.

FIG. 7 is a flow diagram illustrating exemplary steps for adjustment of reported measurements, in accordance with an embodiment of the invention. Referring to FIG. 7, in step 702, the MSC 140 may receive signals from a current cell, and possibly from neighboring cells. In step 704, the signal level measurements may be computed. In step 706, the signal level measurements may be adjusted. In step 708, signal quality measurements may be computed. Step 710 may determine if a measured bit error rate is above a threshold value. If it is, in step 712 a measurement report may be generated that utilizes adjusted signal level and adjusted signal quality measurements. If not, in step 714, a measurement report may be generated that utilizes adjusted signal level and unadjusted signal quality measurements. In step 716, the MS 140 may transmit a traffic measurement report.

Figure 8:
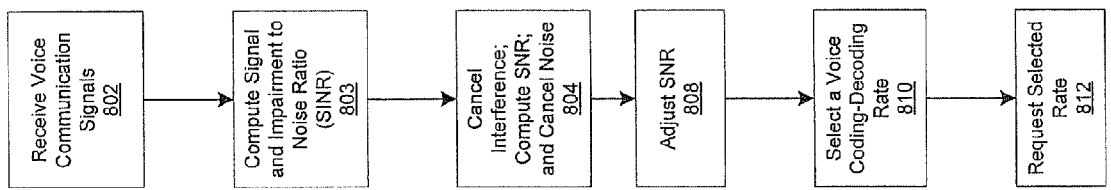
FIG. 8 is a flow diagram illustrating exemplary steps for AMR adaptation, in accordance with an embodiment of the invention.

FIG. 8 is a flow diagram illustrating exemplary steps for AMR adaptation, in accordance with an embodiment of the invention. Referring to FIG. 8, in step 802, the MSC 140 may receive voice communication signals. In step 803, an SINR may be computed. In step 804, a processor 154 within the MS 152 may cancel at least a portion of noise and/or at least a portion of interference in the received signals. An SNR may be computed after the cancelling of interference. In step 808, an SNR value computed during step 804 may be adjusted. In step 810, the MS 140 may select a voice coding and/or decoding rate. In step 814, the MS 140 may send a message to an RNC 128 element or BSC 114 element requesting to utilize the selected coding and/or decoding rates.

Aspects of a system for computing measurements for a wireless communications channel may include a processor 154 that enables computation of at least one signal level measurement for at least one received signal. The processor 154 may enable cancelling of at least a portion of at least one interfering signal received in addition to the received signal based on processing of a received bit sequence using a first burst process (BP) operation in a portion of a first decoding algorithm. The first decoding algorithm may utilize single antenna interference cancellation (SAIC) operations. The processor 154 may also enable cancelling at least a portion of a noise signal received in addition to the at least one received signal based on processing the received bit sequence using a second BP operation in a portion of a second decoding algorithm. The second decoding algorithm may utilize redundancy and impose at least one physical constraint during decoding. The processor 154 may enable adjustment of a value of the computed at least one signal level measurement.

The at least one received signal may include voice communications information and/or comfort noise. The processor 154 may enable computation of the at least one signal level measurement based on a portion of the received signal that contains voice communications information. The processor 154 may enable computation of the signal level measurement based on the portion of the signal that includes voice communications information. The computed signal level measurement parameters may include RXLEV, RXLEV_SUB, RSCP, Ec/No, and/or PILOT_STRENGTH.

The processor 154 may enable computation of at least one signal quality measurement for at least one received signal. The processor 154 may enable adjustment of a value of the at least one signal quality measurement when at least a portion of the noise signal is cancelled. The processor 154 may enable computation of the at least one signal quality measurement based on a portion of the received signal that contains voice communications information. The signal quality measurement may be an RXQUAL, an RXQUAL_SUB, a block error rate (BLER), and/or a bit error rate (BER).

The processor 154 may enable computation of an SNR and/or an SINR based on the received signal. The processor 154 may enable adjustment of a value of the SNR and/or SINR based on cancelling of interfering signals and noise signals. The processor 154 may enable a request of an information transfer rate for receiving subsequent signals based on the adjusted value of the SNR and/or SINR. The processor 154 may enable receipt of a signal via a GSM channel, and/or a TDMA channel.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for computing measurements for a wireless communications channel, the method comprising:
performing by one or more processors and/or circuits, functions comprising:
computing at least one signal level measurement for at least one received signal by performing one or both of:
cancelling at least a portion of at least one interfering signal received in addition to said at least one received signal based on processing of a received bit sequence; and
cancelling at least a portion of a noise signal received in addition to said at least one received signal based on processing said received bit sequence using a decoding algorithm that imposes at least one physical constraint during decoding; and
adjusting a value of said computed at least one signal level measurement.

2. The method according to claim 1, wherein said at least one received signal comprises one or both of voice communications information, and comfort noise.

3. The method according to claim 2, comprising computing said at least one signal level measurement based on a portion of said at least one received signal that comprises said voice communications information.

4. The method according to claim 1, wherein said at least one signal level measurement is one or more of a received signal level (RXLEV), a received signal level subset (RXLEV_SUB), a received signal code power (RSCP), a ratio of energy per modulating bit to noise density (Ec/No), and a pilot strength (PILOT_STRENGTH).

5. The method according to claim 1, comprising computing at least one signal quality measurement for said at least one received signal.

6. The method according to claim 5, comprising adjusting a value of said at least one signal quality measurement when said at least a portion of said noise signal is cancelled.

7. The method according to claim 5, comprising computing said at least one signal quality measurement based on a portion of said at least one received signal that comprises voice communications information.

8. The method according to claim 5, wherein said at least one signal quality measurement is one or more of a received signal quality (RXQUAL), a received signal quality subset (RXQUAL_SUB), a block error rate (BLER), and a bit error rate (BER).

9. The method according to claim 1, comprising computing one or both of a signal to noise ratio (SNR) and a signal to interference plus noise ratio (SINR), based on said at least one received signal.

10. The method according to claim 9, comprising adjusting a value of said one or both of an SNR, and an SINR, based on one or both of said cancelling said at least a portion of said at least one interfering signal and said cancelling said at least a portion of said noise signal.

11. The method according to claim 10, comprising requesting an information transfer rate for receiving subsequent signals based on said adjusted value.

12. The method according to claim 1, comprising receiving said at least one signal via one or both of a global system for mobile communications (GSM) channel, and a time division multiple access (TDMA) channel.

13. A system for computing measurements for a wireless communications channel, the system comprising:
a processor that is operable to compute at least one signal level measurement for at least one received signal;
said processor is operable to perform one or both of:
cancelling at least a portion of at least one interfering signal received in addition to said at least one received signal based on processing of a received bit sequence; and
cancelling at least a portion of a noise signal received in addition to said at least one received signal based on processing said received bit sequence using a decoding algorithm that imposes at least one physical constraint during decoding; and
said processor is operable to adjust a value of said computed at least one signal level measurement.

14. The system according to claim 13, wherein said at least one received signal comprises one or both of voice communications information, and comfort noise.

15. The system according to claim 14, wherein said processor is operable to compute said at least one signal level measurement based on a portion of said at least one received signal that comprises said voice communications information.

16. The system according to claim 13, wherein said at least one signal level measurement is one or more of a received signal level (RXLEV), a received signal level subset (RXLEV_SUB), a received signal code power (RSCP), a ratio of energy per modulating bit to noise density (Ec/No), and a pilot strength (PILOT_STRENGTH).

17. The system according to claim 13, wherein said processor is operable to compute at least one signal quality measurement for said at least one received signal.

18. The system according to claim 17, wherein said processor is operable to adjust a value of said at least one signal quality measurement when said at least a portion of said noise signal is cancelled.

19. The system according to claim 17, wherein said processor is operable to compute said at least one signal quality measurement based on a portion of said at least one received signal that comprises voice communications information.

20. The system according to claim 17, wherein said at least one signal quality measurement is one or more of a received signal quality (RXQUAL), a received signal quality subset (RXQUAL_SUB), a block error rate (BLER), and a bit error rate (BER).

21. The system according to claim 13, wherein said processor is operable to compute one or both of a signal to noise ratio (SNR) and a signal to interference plus noise ratio (SINR), based on said at least one received signal.

22. The system according to claim 21, wherein said processor is operable to adjust a value of said one or both of an SNR and an SINR, based on one or both of the said cancelling said at least a portion of said at least one interfering signal and said cancelling said at least a portion of said noise signal.

23. The system according to claim 22, wherein said processor is operable to request an information transfer rate for receiving subsequent signals based on said adjusted value.

24. The system according to claim 13, wherein said processor is operable to receive said at least one signal via one or both of a global system for mobile communications (GSM) channel, and a time division multiple access (TDMA) channel.

\* \* \* \* \*